United States Patent Office 3,078,294
Patented Feb. 19, 1963

3,078,294
PROCESS FOR MAKING PYROCARBONATE ESTERS
Joseph H. Howe, Freeland, and Leo R. Morris, Midland, Mich., assignors to The Dow Chemical Company, Midland, Mich., a corporation of Delaware
No Drawing. Filed Mar. 17, 1961, Ser. No. 96,392
4 Claims. (Cl. 260—453)

This invention relates to a novel process for making esters of pyrocarbonic acid. More particularly, it relates to the preparation of alkyl and aralkyl pyrocarbonates in improved yields by a more direct method than was known heretofore.

The commonly used method for making pyrocarbonate esters in the prior art comprises two steps, the first step being the reaction of phosgene or carbonyl chloride with an alcohol to produce the corresponding chloroformate, and the second step being the reaction of the chloroformate product with the metal salt of a carbonate half ester to form the desired pyrocarbonate. These reactions proceed as shown by the following equations, R representing a hydrocarbon radical:

(1)    $ROH + COCl_2 \rightarrow ROCOCl + HCl$ (2)    $ROCOCl + ROCO_2Na \rightarrow ROCO_2CO_2R + NaCl$ The metal carbonate half ester may be obtained by reacting carbon dioxide with the metal salt of an alcohol.

The above-described prior art process, while a feasible method, by its nature involves some inherent limitations and disadvantages. Among these are difficulties in separation and recovery of reactants, products, and byproducts in the preparation of the chloroformate intermediate. Chloroformate yields are only fair and some chloroformates are too unstable to isolate and store readily. Reaction of the chloroformate with the metal carbonate half ester produces carbonates as undesirable byproducts which are difficult to separate from the pyrocarbonate product. Overall yields of the process are relatively low.

It has now been found that alkyl and aralkyl pyrocarbonates are produced in relatively good yields and substantially free of carbonate byproducts by a simpler and more direct process whereby about two moles of a metal carbonate half ester are reacted with a mole of phosgene, the reaction being carried out by contacting the two reactants in an inert solvent at a temperature from about —10° C. to about 75° C. The metal carbonate half ester reactant is represented by the general formula:

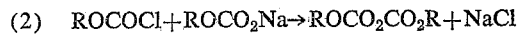

wherein M is an alkali metal, ordinarily sodium or potassium, and R is an alkyl or aralkyl radical.

The reaction proceeds according to the equation:

$2ROCO_2Na + COCl_2 \rightarrow ROCO_2CO_2R + 2NaCl + CO_2$

The two byproducts are easily separated from the product, gaseous carbon dioxide being evolved from the mixture, and the metal salt precipitating as an insoluble solid separable by filtration or by a water wash from the pyrocarbonate product which remains dissolved in the inert solvent reaction medium.

By the term inert solvent is meant a solvent which is unreactive with the reactants, particularly with phosgene, and one which is capable of dissolving at least some of the metal carbonate half ester. Some suitable solvents are benzene, toluene, octane, chloroform, carbon tetrachloride, methylene chloride, dioxane, tetrahydrofuran, acetone, and many others of similar nature. The proportion of solvent required is not critical so long as there is enough present to maintain a reasonably fluid reaction mixture. We have found that a total of about 0.5–1.0 liter of solvent per gram mole of metal carbonate half ester is an appropriate amount.

The reaction of phosgene with a metal carbonate half ester may be carried out at a temperature within the range from about —10° C. to about 75° C. We prefer to operate at a temperature of about 0° C. to about 50° C., and usually we find it most convenient to operate at about normal room temperature.

The proportion of the two reactants is preferably about the theoretical two moles of metal carbonate half ester to one mole of phosgene. A slight excess of phosgene may be employed to drive the reaction to completion, however, too large an excess of phosgene will result in formation of some undesirable chloroformate.

Although the reaction is normally run under atmospherical pressure, in some cases it is of advantage to run under a moderate pressure of carbon dioxide.

Our process is operated by adding phosgene, or a solution of phosgene in an inert solvent, slowly to a stirred suspension of an alkali metal carbonate half ester in an inert solvent, preferably at about 0–50° C. and using about one mole of phosgene to two moles of carbonate. After addition of the phosgene, the reaction mixture is stirred until the reaction is substantially complete as evidenced by titration for chloride or for alkali content. The total time required is usually a matter of 3–5 hours. The reaction mixture, which then consists essentially of pyrocarbonate ester dissolved in the reaction solvent and precipitated metal chloride, may be blown with an inert gas to remove residual phosgene and filtered or water-washed to remove the precipitated salt. The pyrocarbonate ester may be recovered by removal of the solvent from the filtrate by evaporation or by vacuum distillation.

Mixed pyrocarbonate esters may be prepared by our process by reacting phosgene with a mixture of two different carbonate half esters. By this procedure there is obtained both the mixed ester and the two possible symmetrical esters.

*Example 1*

Sodium ethyl carbonate was prepared by the conventional method of dissolving 96.2 g. of metallic sodium in 2000 ml. of absolute ethyl alcohol at room temperature and then bubbling carbon dioxide into the sodium ethoxide solution thereby obtained for about 8 hours. An additional 300 ml. of absolute ethyl alcohol was added when the reaction mixture became too thick to stir efficiently. The product was filtered from the reaction mixture and dried under vacuum at 45–50° C. The dry product amounted to 458 g. of sodium ethyl carbonate of 97.7% purity by carbon dioxide determination.

A 2 liter flask fitted with a stirrer and a condenser cooled by a solid carbon dioxide-acetone bath was charged with 229 g. of sodium ethyl carbonate and 1200 ml. of dry toluene. The mixture was stirred and its temperature was held at 43–46° C. while 103 g. of phosgene was added over the surface during a 2 hour period. After standing overnight at room temperature, the reaction mixture was found to be alkaline and an additional 30 g. of phosgene was added at 45–55° C. The now acid reaction mixture was flushed with nitrogen and filtered to remove sodium chloride. Vacuum distillation yielded 125.4 g. of colorless diethyl pyrocarbonate, 98–100% pure by infrared analysis, B.P. 69° C./3.7 mm.

*Example 2*

A 2 liter flask fitted with a stirrer and a condenser cooled by a solid carbon dioxide-acetone bath was charged with 63 g. of sodium isopropyl carbonate prepared by the method of Example 1 and 250 ml. of dry toluene. To the stirred mixture was added dropwise a solution of 30 g. of phosgene in 250 ml. of cold toluene over a period of 1¾ hours at a reaction temperature of about 25° C. Carbon dioxide was given off in the course of the addition. After the phosgene solution had been added, the somewhat gel-like reaction mixture was stirred another 2 hours at room temperature and flushed with nitrogen. About 200 ml. of solvent was removed from the reaction mixture by distillation and the gel-like solid was filtered from the remaining mixture. The solid was washed with toluene and the combined filtrates were distilled under vacuum to give 31.6 g. of diisopropyl pyrocarbonate, B.P. 50–51° C./0.6–6 mm. Redistillation yielded a colorless liquid product of constant boiling point 85° C./5 mm., pure diisopropyl pyrocarbonate by infrared analysis.

*Example 3*

A suspension of sodium benzyl carbonate was prepared by reacting carbon dioxide with about 1.0 g. mole of the sodium salt of benzyl alcohol in about one liter of a solvent mixture made up of tetrahydrofuran, dioxane, and toluene. To this suspension was added 50 g. of phosgene over a period of 1½ hours at 40–45° C. with stirring. After the addition was completed, the reaction mixture was stirred another 5 hours at the same temperature. An additional 4–5 g. of phosgene was then added when the reaction mixture was found to be slightly alkaline and stirring was continued for a further period. The reaction mixture was stirred with 3 liters of cold water and the organic solvent layer was separated and dried with anhydrous sodium sulfate. Low-boiling volatile materials were removed by heating to 40–45° C./1–2 mm. The residue was found to be crude dibenzyl pyrocarbonate.

By following the general procedure as described in the above examples, other alkyl and aralkyl pyrocarbonates may be prepared, for example, dimethyl pyrocarbonate, dibutyl pyrocarbonate, dihexyl pyrocarbonate, dioctyl pyrocarbonate, diphenethyl pyrocarbonate, bis(p-methylbenzyl) pyrocarbonate, and the like.

We claim:

1. A process for making pyrocarbonate esters which comprises reacting by contacting one mole of phosgene with about two moles of a carbonate of the general formula

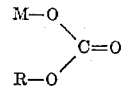

wherein M is an alkali metal and R is a hydrocarbon radical taken from the group consisting of alkyl and aralkyl radicals at a temperature of about −10° C. to about 75° C.

2. The process of claim 1 wherein the pyrocarbonate ester is separated from the reaction mixture.

3. A process for making alkyl pyrocarbonates which comprises reacting by contacting about two moles of an alkali metal alkyl carbonate with one mole of phosgene in an inert solvent at about −10° C. to about 75° C.

4. A process for making alkyl pyrocarbonates which comprises reacting by contacting about two moles of an alkali metal alkyl carbonate with one mole of phosgene in an inert solvent at about 0° C. to about 50° C. and separating the alkyl pyrocarbonate product thereby obtained.

References Cited in the file of this patent

Boehm et al.: Ber. 71 B, 1797–1802 (1938).
Parfentev et al.: Chem. Abs. 49, 6539a (1955).